United States Patent
Atazky et al.

(10) Patent No.: US 8,560,385 B2
(45) Date of Patent: Oct. 15, 2013

(54) ADVERTISING AND INCENTIVES OVER A SOCIAL NETWORK

(75) Inventors: Ron Atazky, Tel-Aviv (IL); Ehud Barone, Petach-Tikva (IL)

(73) Assignee: Bees & Pollen Ltd., Savyon (IL)

( * ) Notice: Subject to any disclaimer, the term of this patent is extended or adjusted under 35 U.S.C. 154(b) by 1446 days.

(21) Appl. No.: 11/512,595

(22) Filed: Aug. 30, 2006

(65) Prior Publication Data
US 2007/0121843 A1    May 31, 2007

Related U.S. Application Data

(60) Provisional application No. 60/596,146, filed on Sep. 2, 2005.

(51) Int. Cl.
*G06Q 30/00* (2012.01)
(52) U.S. Cl.
USPC .................. 705/14.19; 705/14.11; 705/14.16
(58) Field of Classification Search
USPC .......... 705/14.11, 14.16, 14.19, 14.43, 14.49, 705/14.66
See application file for complete search history.

(56) References Cited

U.S. PATENT DOCUMENTS

| | | | | |
|---|---|---|---|---|
| 5,537,314 | A * | 7/1996 | Kanter ....................... | 705/14.13 |
| 7,197,470 | B1 * | 3/2007 | Arnett et al. ................. | 705/7.29 |
| 7,246,083 | B2 * | 7/2007 | Bibelnieks et al. ........ | 705/14.43 |
| 2005/0216338 | A1 | 9/2005 | Tseng et al. | |
| 2006/0085253 | A1 | 4/2006 | Mengerink et al. | |

* cited by examiner

*Primary Examiner* — Namrata Boveja
*Assistant Examiner* — Michael Goldman
(74) *Attorney, Agent, or Firm* — Stein IP, LLC

(57) ABSTRACT

A method whereby advertisers wish to deliver at least one of offerings and advertising messages relative to at least one of a product and a service to a target audience of users selected by a system operator during an advertising campaign. The method includes defining the users within the context of a social network, selecting the users from among the users of the social network, storing the information relevant to the defined users and utilizing the information stored/defined within the social network to deliver the messages to the users in an optimal manner.

6 Claims, 18 Drawing Sheets

Advertiser login

(810)

Login: _____
Password: _____

Fig. 8A

Campaign Configuration

(820)

Campaign name: _____
Target audience location: _____

Promoted item: [▼]

Max monthly budget: $ _____
Discount value: $ _____
Discount expiration time: _____ (in days)

Fig. 8B

| Active Campaigns Management | | | | | (830) |
|---|---|---|---|---|---|
| Campaign Name | Launch date | Status (active, standby) | Max monthly budget | Budget reserved | Spent budget |
| | | | | | |
| | | | | | |

Fig. 8C

Users Rating Database

US 8,560,385 B2

ADVERTISING AND INCENTIVES OVER A SOCIAL NETWORK

RELATED APPLICATIONS

This application claims the benefit of U.S. provisional patent application 60/596,146 filed Sep. 2, 2005.

FIELD OF THE INVENTION

The present invention relates generally to marketing over the Internet, and more particularly to a method for marketing, advertising and offering incentives over a social network implemented over the Internet.

BACKGROUND OF THE INVENTION

The purpose of advertising is to influence people into changing/enforcing behavior. In order to produce maximum effect using minimum resources promoters aim to tailor the message to the target audience and to target message delivery to the appropriate audience.

Additionally, a form of advertising called "viral" or word-of-mouth has become increasingly popular in recent years. The core concept is to "seed" the advertised message with a select group of the target audiences and have the message spread by word-of-mouth.

In parallel, the concept of formalizing, modeling and utilizing social networks has become popular in the Internet industry. Numerous examples exist: MySpace, LinkedIn, epinions, Amazon's friends & recommendations and others. Additionally, a large amount of academic work has been published relating to the modeling of trust relationship within a social network, on context-sensitive trust, on deriving the trust relations from communication patterns, etc.

The prior art includes a Method And System to Utilize a User Network Within a Network-Based Commerce Platform, U.S. patent application Ser. No. 10/968,197, to Mengerink, et al filed Oct. 18, 2004. The application discloses a method and a system to utilize a user network within a network-based commerce platform. For example, the method includes identifying a target group including at least one other user of the network-based commerce system based on at least one group association rule, the at least one group association rule being selected by a first user, communicating transaction information to the identified target group, and facilitating the transaction between at least one target user of the identified target group and the first user, wherein the first user and the identified target group have an existing relationship.

In U.S. patent application Ser. No. 11/000,707 to Tseng, et al, filed Nov. 30 2004, titled: "Enhancing Virally-Marketed Facilities", disclose a method and apparatus for enhancing a virally marketed facility. In one embodiment, the invention is a method of operating a virally marketed facility. The method includes measuring virality of the facility based on a conversion rate and a propagation rate. The method also includes determining potential options for increasing virality. The method further includes executing potential options for increasing virality. In an alternate embodiment, the invention is a method of operating a virally marketed facility. The method includes measuring virality of the facility. Also, the method includes determining potential options for increasing virality. Further, the method includes concurrently executing potential options for increasing virality.

The existence of social networks is well known, allowing for ranking of more and less influential individuals, etc. However, the use of a social network for more focused delivery of advertising based on the opportunities available with the advent of the Internet remains undeveloped.

SUMMARY OF THE INVENTION

Accordingly, it is a principal object of the present invention to provide a system of targeted advertising utilizing a social network.

It is another principal object of the present invention to provide to achieve the goal of any advertising campaign, which is to advance a message and communicate it in the most convincing way to the target audience.

It is a further principal object of the present invention to identify key members of a social network and provide them with incentives to review and then spread by word-of-mouth the product or service in question, wherein minimum resources are expended to produce maximum effect.

It is one other principal object of the present invention to provide advertisements and promotions to affect people's behavior by addressing them with information and incentives.

A method is disclosed whereby marketers and advertisers wish to deliver at least one of offerings and advertising messages relative to at least one of a product and a service to a target audience of users selected by a system operator during a marketing/advertising campaign. The method includes defining the users within the context of a social network, selecting the users from among the users of the social network, storing the information relevant to the defined users and utilizing the information stored/defined within the social network to deliver the messages to the users in an optimal manner.

Applicable configurations:

Social network—can be MySpace, email, telephone log;

E-Commerce sites, classified sites promoting diverse products/services;

Context sensitive advertisement mediums (e.g. search-engines); and

User forums (e.g. emails, blogs).

The social network can be comprised of one or more:

Integrated social network where accessibility to all data is available;

Data mining existing social networks (e.g. MySpace), limited to data available to public; and Traceable virally distributed messages (e.g. coupons, emails).

Media advertising, however, is only one of the ways by which one learns of new products, services or events. Another is word of mouth from friends, from business associates, from professional reporters and reviewers who are trusted, or even by watching celebrities who are enamored. Such an approach has the advantage of combining information with a relationship of trust. One trusts the origin of the message, and hence the message.

A company's reputation, for example, is built over time from an extensive support network of word-of-mouth. When close people refer to a supplier as reliable, one tends to take that on faith.

The importance of social contexts in distributing messages has not escaped the notice of advertisers, and so was born the concept of viral advertising. A message is "injected" into the population to a select group and then spreads person-to-person. Movies sometimes use this approach to create excitement and large attendances in the opening weekend. Another example is free/VIP passes offered to celebrities at clubs and other entertainment venues.

In parallel, the academic research into social networks has matured into deployed systems: Friendster, Linked-in, Amazon's "Friends & Recommendations", and many other examples, which can be found, for example, at http://en.wikipedia.org/wiki/Social network These implementations of social networks map the inter-relations between users. The idea is to ascertain which users are more "central" than others, extract typical flows of information between members, etc. The more central users, those with whom more people communicate, to whom more people listen and who more people trust are termed "opinion leaders".

It is important to note that being an opinion leader is a matter of degree. Some members of the social network have more influence and higher ranking, and some lower. But there is no clear distinction between opinion leaders and regular users.

The present invention discloses embodiments wherein the system described is separate from the social network, which is owned/operate by some $3^{rd}$ party; and embodiments where the system of the present invention makes use of multiple social networks simultaneously. This will be discussed in detail in the following sections.

The following differentiates between the present invention and the prior art patents in the background in the prior art findings.

The above-referenced application no. 20060085253 is referred to hereinafter as 253. The present invention, referred to hereinafter as PI, concentrates on ways to encourage opinion leaders to advertise and market products or services.

As such PI addresses:
Inter-trust (not addressed by 253):
Sorting opinion leaders based on context (e.g. category); and
Sorting opinion leaders based on non-contextual (e.g. degree of separation) and contextual inter-trust (ratings on one anothers' reviews, communication level)
No-relations (as opposed to 253, claims 24, 33):
To leverage credibility PI prefers opinion leaders who are not biased, thus having no relations (direct or indirect) with the advertiser. PI targets only the most influential users and motivates them to perform actions.
Transaction related:
PI transactions are based on incentive to encourage the user to try out a product. Rather than generating a purchase order by auction or other means, PI tries to get the target user to try out the product and contribute his opinion.
PI provides a review serving the advertiser's benefit. Thus, the transaction type can be broader than a purchase or an auction
Opinions dissemination:
The whole topic of opinions dissemination is disregarded by patent 253. In PI each user can sort the opinions/reviews by different criteria:
Credibility—persuade consumers that are closely related to the opinion leaders and trust them most;
Recentness—persuade consumers that are influenced by the latest opinions; and
Quantity—persuade consumers that act on critical mass/popularity.
Intelligent incentives policy—
Further to 'Opinions dissemination' above, PI studies the users' online behavior and accordingly operates the most efficient incentives policy:
Credibility—in case the target users' are looking for credibility (sort by relations), the incentives would be targeted to more centralized opinion leaders
Recentness—where users' sort by date of review, incentives will be granted periodically
Quantity—where users' sort by quantity, incentives will focus on small crowds in order to leverage total quantity
Opinion leader credit—PI incentives policy can also account for the opinion leaders cooperation level. This approach can operate similarly to the "US credit program" which entitles people to build their credit in a progressive manner only after they have proven themselves in smaller sums. PI can adapt this scheme, letting opinion leaders enjoy smaller incentives at first and gradually, when they enter reviews and reviews of higher quality (e.g. attached videos, pictures, better stories) they'll be granted higher incentives. Thus satisfied, creative customers are rewarded for creating powerful word-of-mouth advertising.

System application/architecture: 253 discusses a user network of a network-based commerce platform. PI is more diverse, extending to support and integrating one or more social network sites, one or more commerce sites, one or more reviews/forum/blogs sites. These three can be united or distributed. Exemplary applications:
eBay and Skype—powerful mix where the auction site can utilize a social network partner to encourage opinion leaders to generate a powerful buzz to leverage sales.
Classifieds mixed with social networks (e.g. MySpace)—opportunity to attract opinion leaders from the social network to tryout classified products and services, contribute their word of mouth and help sales.
Scope of operation—PI selects only the most promising and suitable social networks and operates on them alone.
Campaign management—the whole issue of campaign management and the incentives budget management is disregarded by 253.

The above-referenced application no. 20050216338 is referred to hereinafter as 338.

338 focuses on viral effect measurement and the options for increasing it. PI also relates to this issue but in an innovative way, and uses a more specific method of targeted reputation building.

PI may operate on numerous facilities rather than one. PI may not advertise to or act in the name of a single restaurant or Web-site. PI may connect a community (or more) of opinion leaders with a community (or more) of advertisers.

338 disregards the whole cycle of reviews provisioning.

PI may operate on behalf of numerous advertisers, as opposed to 253 and 338. PI may aggregate a whole set of advertisers that together gives the opinion leaders much more added value in building their reputation and credit. After all, the opinion leaders have something to gain and lose from the aggregated total of offerings and not just from one advertiser.

Invention Overview

The system of the present invention is designed to make full and rigorous use of social networks to achieve a new level of advertising, primarily via word-of-mouth.

Using knowledge of the social network, in what context the inter-personal connection is made and how strong/trustworthy this connection is, the system of the present invention allows an advertiser to deliver relatively small scale, but very highly focused advertising, possibly with associated incentives, to the key people in the most appropriate communities in the sense of targeted social-networks.

This message would then propagate via the social interaction, as modeled by the social network, and would not only gain the advantage of free dissemination, but also would benefit from the level of trust in which members of the social network hold each other.

Alongside the original advertiser's message, such as product offering, the social network allows the addition of user reviews, endorsements and other feedback. Thus, the message may be either very significantly re-enforced by positive reviews from trusted members of the network, or detracted.

In a preferred embodiment, advertisers specify the message(s) they wish the system to deliver, and specify various characteristics of the target audience. The system then queries the social network(s) for the appropriate users and delivers the message to them. In many cases, the advertisers would be charged for this service.

To encourage endorsement of the advertiser's offering, the advertiser would often attach incentives to the message delivered to the opinion leaders. These may take various forms, such as giveaways, early access to offerings or even a cash giveaway. Note that the offering of the incentive predates the generation of possible endorsement and is therefore not directly linked to producing a positive review. When applicable, the user may be given the incentive only after posting his review of the product/offering.

In some instances, such as when the use of an incentive requires reservation, or when the user receives the incentive prior to making his opinion of the product known, the user may be asked to pay a token fee to obtain higher chances that the incentive will be used and a review will be generated.

There has thus been outlined, rather broadly, the more important features of the invention in order that the detailed description thereof that follows hereinafter may be better understood. Additional details and advantages of the invention will be set forth in the detailed description, and in part will be appreciated from the description, or may be learned by practice of the invention.

BRIEF DESCRIPTION OF THE DRAWINGS

In order to understand the invention and to see how it may be carried out in practice, a preferred embodiment will now be described, by way of a non-limiting example only, with reference to the accompanying drawings, in which:

FIG. 8a is an advertiser secured login into his account, constructed in accordance with the principles of the present invention;

FIG. 8b depicts an input display where the advertiser specifies the parameters of a campaign, constructed in accordance with the principles of the present invention;

FIG. 8C shows an exemplary embodiment of a schematic diagram of a display screen for campaign management presenting a list of active campaigns of a logged-in advertiser, constructed in accordance with the principles of the present invention;

DETAILED DESCRIPTION OF AN EXEMPLARY EMBODIMENT

The principles and operation of a method and an apparatus according to the present invention may be better understood with reference to the drawings and the accompanying description, it being understood that these drawings are given for illustrative purposes only and are not meant to be limiting.

Figure 1:
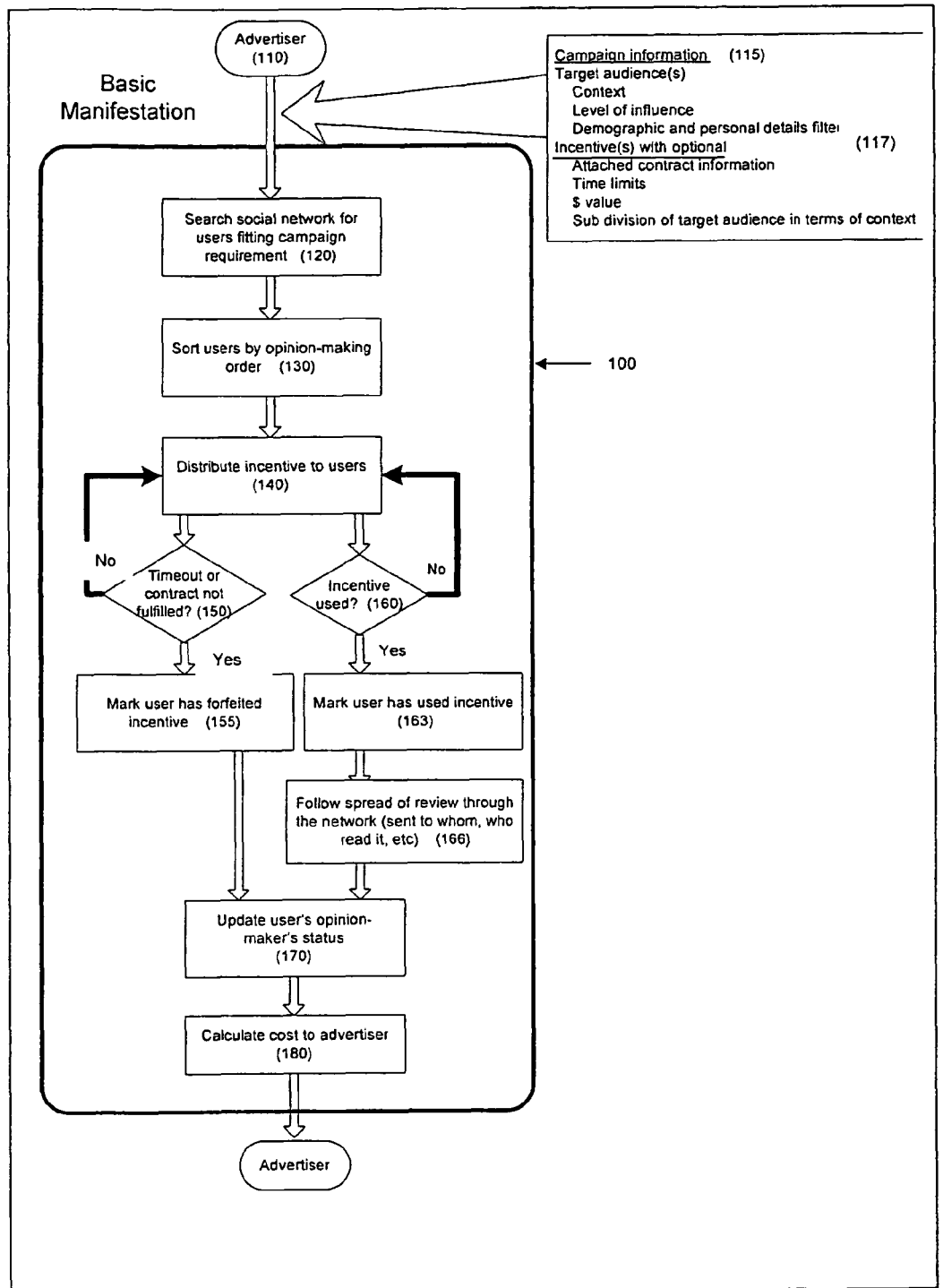
FIG. 1 is a schematic block diagram of an overview of the advertising campaign process, constructed in accordance with the principles of the present invention.

FIG. 1 is a schematic block diagram of an overview of the advertising campaign process 100, constructed in accordance with the principles of the present invention. An advertiser 110, with inputs of campaign information 115 and incentive information 117, provides input to search the social network for users fitting the campaign requirements 120. Then users are sorted by opinion-making order 130 and incentives are distributed to the users 140. If the time runs out or the contract is not fulfilled 150 the user is marked as having forfeited the incentive 155. If the incentive is used the user is marked as having used the incentive 163 and the spread of the review is followed through the network, such as sent to whom, who read it, etc 166. Finally, the user's opinion-maker's status is updated 170 and the cost to the advertiser is calculated 180.

System Framework

The present invention can be implemented in any of the following alternative embodiments:

A stand-alone Web site/portal with its own social network;

An advertisement/incentive system integrated into an existing social-network, community or commerce site;

A single system integrated into multiple existing social-network, community or commerce site;

Such an implementation will require identifying a single user across multiple social networks, and most likely be performed by a user identifying himself with a common identifier in all member systems;

A standalone site integrating social network information from multiple networks. A similar inter-network identity matching will be required; and A standalone advertisement/incentive system data mining one or more existing social-network, community or commerce sites.

Figure 2:
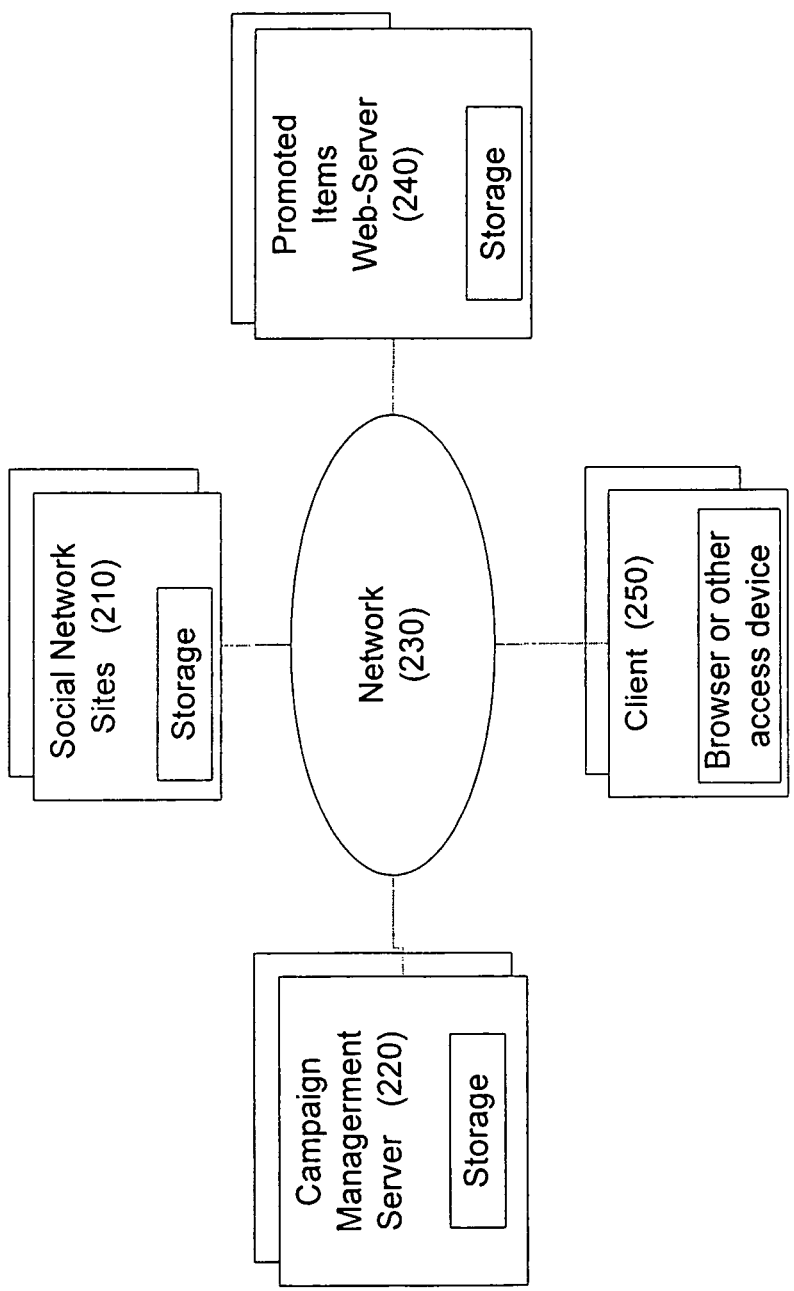
FIG. 2 is a schematic illustration of the relationship between a network and one embodiment of the system and method for generating an incentive driven social network advertisement, constructed in accordance with the principles of the present invention.

FIG. 2 is a schematic illustration of the relationship between a network 230 and one embodiment of the system and method for generating an incentive driven social network advertisement, constructed in accordance with the principles of the present invention. Components appearing in the diagram are as follows:

Social network sites 210—one or plurality of social network sites 210 in which users' profiles are defined and the social ties between users are conceived and developed over time;

The robustness of the social network can vary from a full-fledged online site such as Friendster and MySpace down to a simple list of friends connected to one another. In certain manifestations, the interpersonal relationships may even be generated by data mining past interactions, including extraneous collaborative systems, such as email databases or even virally distributed messages.

Promoted items Web-server 240, either:

A dedicated Website which displays advertising messages and offers incentives to users; or One or a plurality of sites in which different items (e.g. merchandise, articles, digital music files) are offered (example: Amazon, iTunes, etc). To these items, promotional messages and incentives may be attached and viewed next to word-of-mouth (reviews) of people who the social network indicates as trusted by the user;

Client 250—a device the user uses to access the network. This may be a personal computer equipped with a Web browser, a internet-enabled phone, an internet-enabled television, PDA, etc.

The user may access any of the sites described above—one of the social networks, a commerce site, the dedicated promotional site, etc. The linking of user identity across multiple sites may be achieved by having the user explicitly creating the link using the system of the present invention; and Campaign management server 220, the system of the present invention.

System Components

Figure 3:
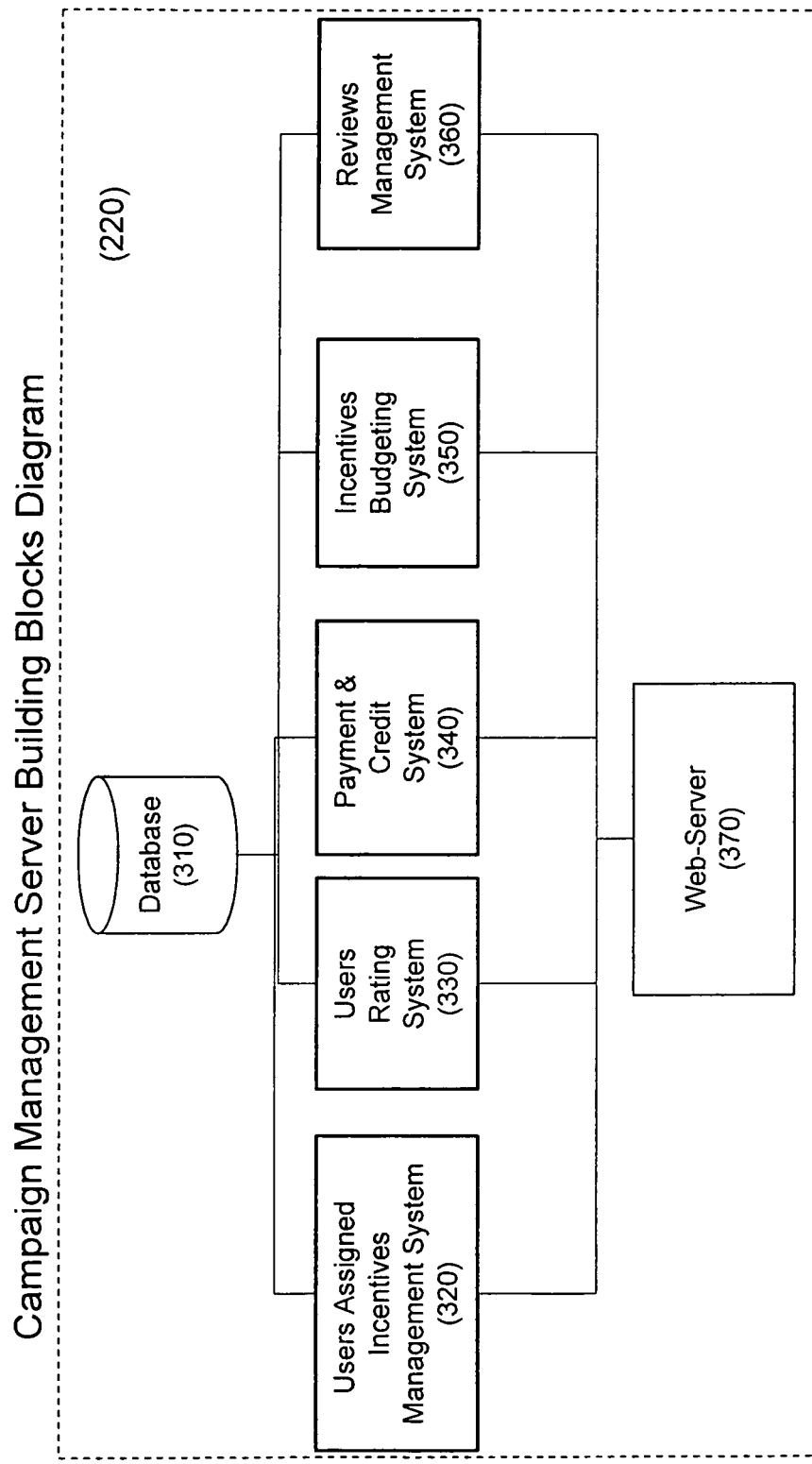
FIG. 3 is an exemplary implementation of the system breakdown into functional modules, constructed in accordance with the principles of the present invention.

FIG. 3 is an exemplary implementation of the Campaign management server 220, the system of the present invention, breakdown into functional modules, constructed in accordance with the principles of the present invention.

A users rating system 330 rates each user's value to each of his peers (accounting parameters such as inter-trust level, communication volume, etc.) and to the advertisers (accounting parameters such as activity level, invited peers' activity, etc.). It should be noted that the rating may be context-sensitive, thus calculated per context;

An users assigned incentives management system 320 manages the lifecycle of an incentive from the moment it was reserved by a user; for more detail reference is made to FIG. 16, the "Rewards State Diagram" below;

An incentives budgeting system 350 processes the active campaigns and classify incentives to users based on their ratings (e.g. social network influence, correlation with campaign target audience specifications) and other optional rules derived from advertiser's or operator's policies;

A payment and credit system 340 is a credit card payment system through which a user and/or an advertiser manage their account credit and charged for a commission based on the pricing policy applied.

A reviews management system 360 accumulates reviews sent by users, ranks reviews based on the author's inter-trust in respect to its viewer, provide reviews to promoted items Web-servers given the logged in user identity, distributes new reviews to subscribed users and more; and A Web-server, which allows terminal clients running Web-browsers to connect through a secured HTTP connection (or other protocol) to various administrative tools related to described systems.

The User's Perspective

This section depicts the system of the present invention as seen from the point of view of the end user. Several possible manifestations of the invention are presented.

In certain embodiments of the system, the promotional messages, incentives and social-network trust enhanced reviews are not presented in a dedicated Website, but are rather integrated into other sites, such as E-Commerce retails sites (e.g. Amazon)

User aware search engines (e.g. Yahoo)

Social network sites (e.g. MySpace, Friendster)

E-mail server featuring targeted advertisements (e.g. GMail)

Search engines featuring targeted advertisements (e.g. Google)

Comparison shopping sites

Retailers catalog distributed by email

Examples of some possible manifestations are presented below.

A Dedicated System

An exemplary embodiment of the system includes a site dedicated to presenting the users with advertiser's messages and associated incentives. In addition, the system will promote the word-of-mouth advertising which it implements by displaying most-endorsed offerings in the user's area of interest. Similarly, the system may promote higher incentives by putting them in a more prominent placement then the lower ones.

Figure 4:
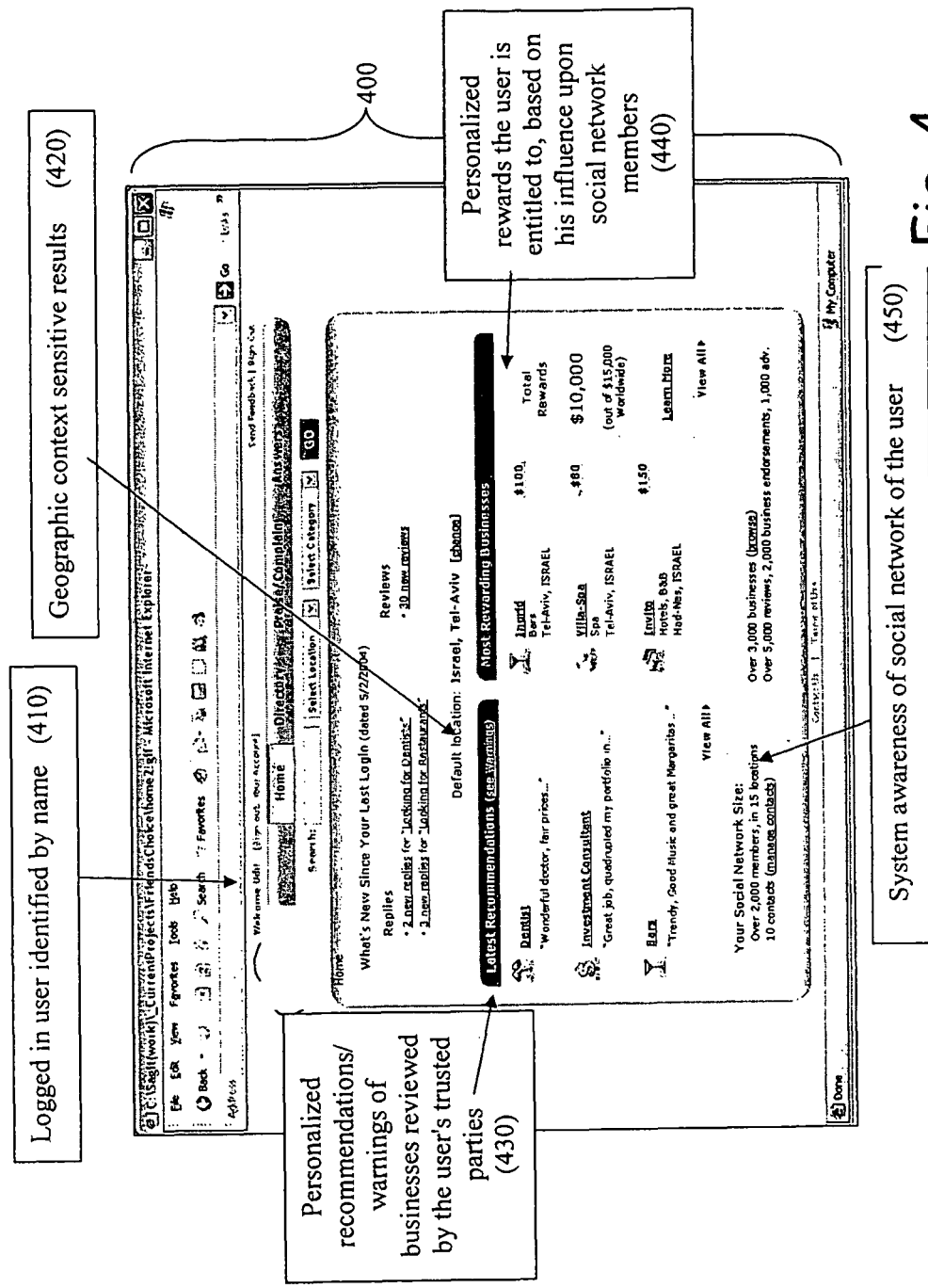
FIG. 4 is a screenshot of a typical user's screen in the dedicated promotion system manifestation of the invention, depicting typical element, constructed in accordance with the principles of the present invention.

FIG. 4 is a screenshot of a typical user's screen 400 in the dedicated promotion system manifestation of the invention, constructed in accordance with the principles of the present invention. The logged-in user is identified by name 410 and the results are geographic-context sensitive 420. The personalized recommendations/warnings of the businesses reviewed by the user's trusted friends and associates 430 are listed, along with the personalized rewards the user is entitled to, based on his influence upon social network members 440. The system also shows awareness of social network of the user 450.

Embedding in a Business Directory

Another possible embodiment of the present invention will integrate the word-of-mouth endorsement offerings on a pre-existing Yellow-Pages like site. This is by contrast with the simple listings available on current sites, or listings matched with anonymous reviews or reviews by those who are unknown and not trusted by the user.

Figure 5:
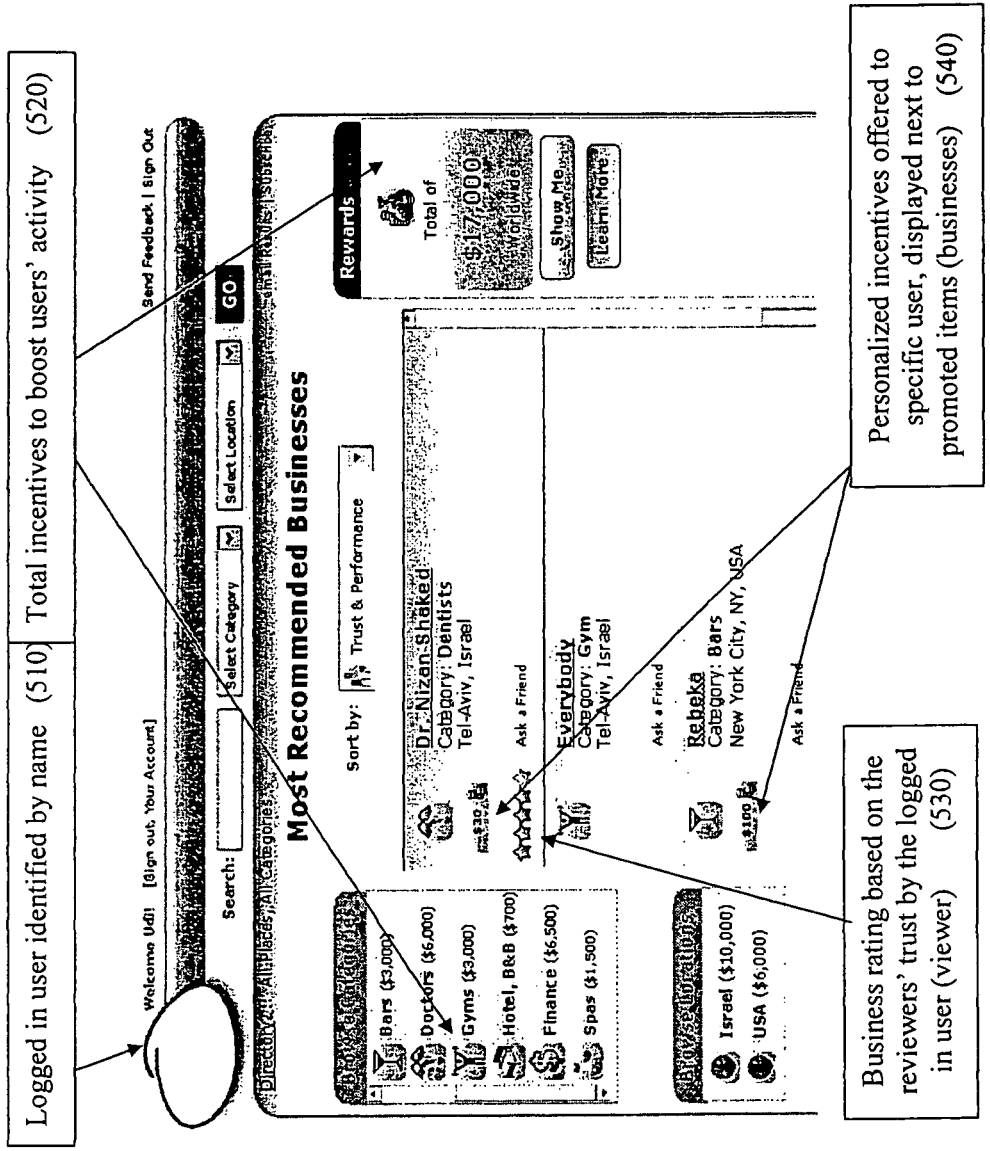
FIG. 5 is an exemplary screenshot of a Website promoting businesses which uses campaign management to promote advertised businesses by encouraging users to try out the business and send a review in return for an incentive, constructed in accordance with the principles of the present invention.

FIG. 5 is an exemplary screenshot of a Website promoting businesses which use campaign management to promote advertised businesses by encouraging users to try out the business and send a review in return for an incentive, constructed in accordance with the principles of the present invention. Elements worth noting are marked by arrows. A logged in user identified by name 510 and the total incentives to boost users' activity is shown 520. Business rating based on the reviewers' trust by the logged in user (viewer) is given 530 and the personalized incentives offered to a specific user is displayed next to promoted items or businesses 540.

Embedding in a Commerce Site

In a possible manifestation of the system, the recommendations, incentives and information derived from the social networks are embedded into an existing site, such as a commerce, review or auction site.

Figure 6:
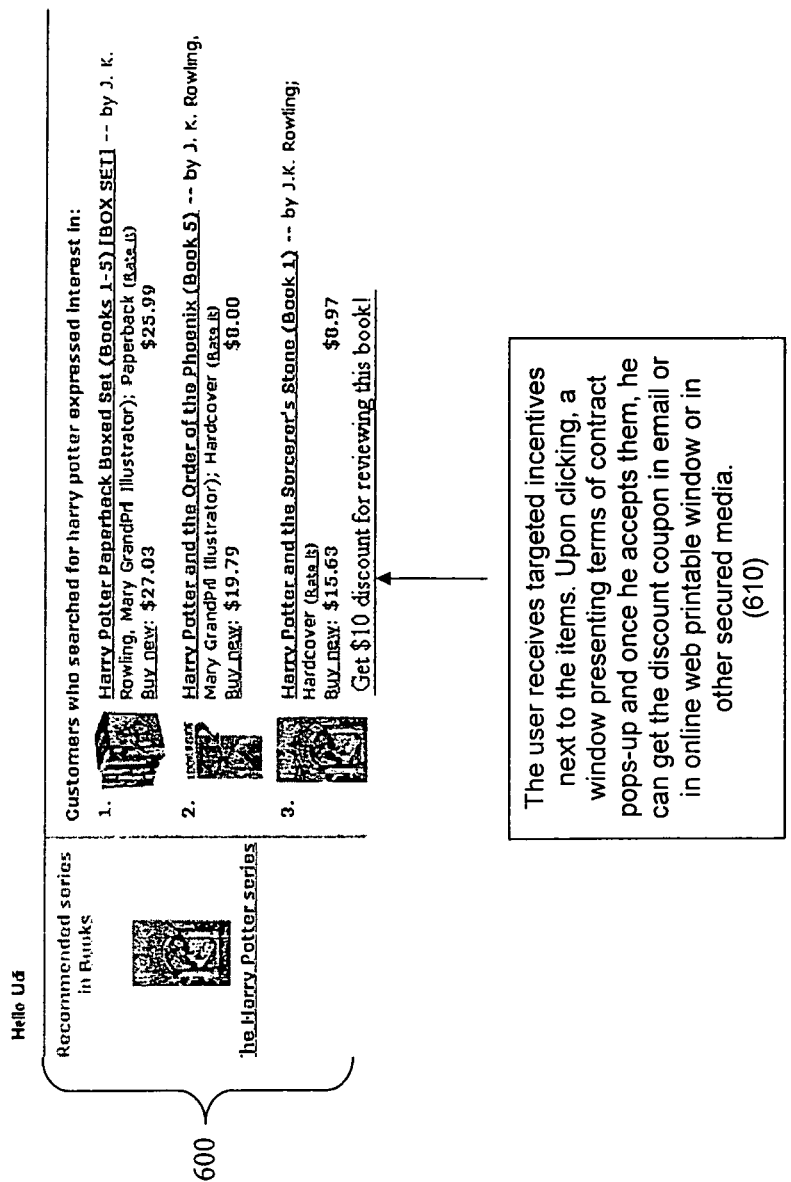
FIG. 6 is a schematic Illustration of integration of the campaign management system into a book store, constructed in accordance with the principles of the present invention.

FIG. 6 is a schematic Illustration of integration of the campaign management system into a book store 600, constructed in accordance with the principles of the present invention. The campaign management system allows the book publishers to promote their items effectively, while generating high quality reviews reaching large advocate audiences of the reviewer. The user receives targeted incentives next to the items. Upon clicking, a window presenting terms of contract pops-up and once he accepts them, he can get the discount coupon in email or in an online Web printable window or in other secured media 610.

Figure 7:
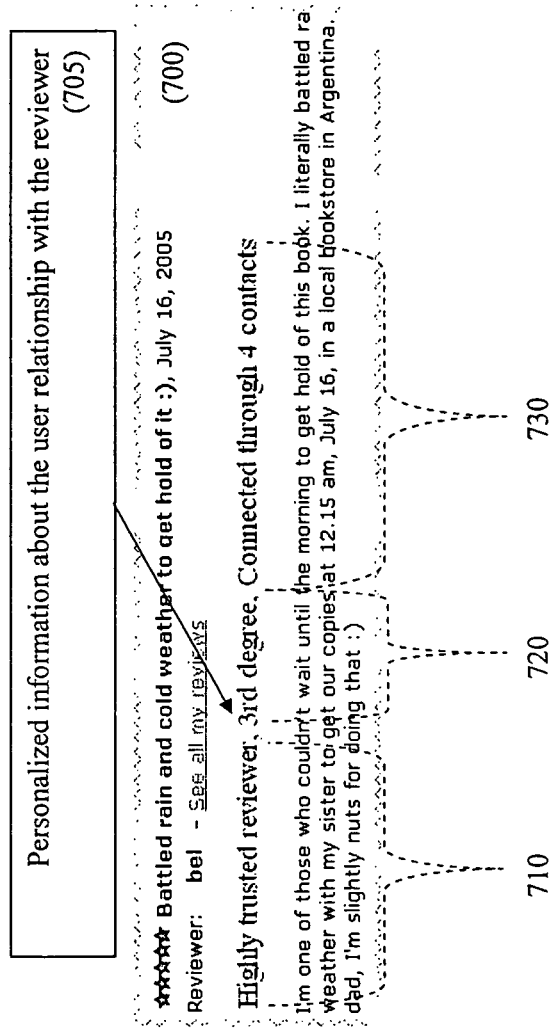
FIG. 7 is a block diagram of an enhanced product review campaign management system, constructed in accordance with the principles of the present invention.

In FIG. 7, below, a further example of commerce site integration is presented, in the form of an enhanced book review campaign management system. Unlike existing review mechanisms available, the present system allows the user to view additional parameters of the reviewer, such as:

Trust level—denotes inter-trust between the user and the author. Note, trust can also be in negative sense, what's known as distrust.

Degree—the shortest path length connecting the user with the reviewer

"Connected through x contacts"—through how many close friends ($1^{st}$ degree) this reviewer can be accessed.

Note that reviews originating from reviewer's who are not closely linked to the user on the social network are not ranked, and may even be discarded to leverage information credibility, relevancy and reduce noise level.

FIG. 7 is a block diagram of an enhanced product review campaign management system 700, constructed in accordance with the principles of the present invention. Personalized information about the user relationship with the reviewer is shown 705. An exemplary enhanced book review is shown. Unlike existing review mechanisms available, the present invention allows the user to view additional parameters of the reviewer's, such as:

Trust level 710, which denotes inter-trust between the user and the author. Note, trust can also be manifested as distrust;

Degree 720, the shortest path length connecting the user with the reviewer; and "Connected through x contacts" 730, i.e., through how many close friends ($1^{st}$ degree) this reviewer can be accessed.

The Advertiser's Perspective

Sample Interface

FIGS. 8a-8c demonstrate display screens and input screens presented to an advertiser accessing the campaign management server in one exemplary embodiment of the present invention:

FIG. 8a is an advertiser secured login into his account 810, constructed in accordance with the principles of the present invention. FIG. 8b depicts an input display where the advertiser specifies the parameters of a campaign 820, constructed in accordance with the principles of the present invention:

Campaign name—used as identifier for this campaign

Target audience location—defines target audience residential location

Promoted item—the item the campaign is targeted to promote/advertise

Max monthly budget—the maximal budget (total discounts) the system is entitled to spend for this specific item Discount value—the value of the discount to be granted to the "opinion leader"

Discount expiration time—the maximal period of time the "opinion leader" can redeem his discount once he has reserved it.

Note that the specific embodiment above does not cover all methods of campaign definition as described in this invention (and described both in the "claims" and "description" sections).

FIG. 8C shows an exemplary embodiment of a schematic diagram of a display screen for campaign management presenting a list of active campaigns of a logged-in advertiser 830, constructed in accordance with the principles of the present invention. This screen may be used for a campaign to deactivate, reactivate, make budgetary changes and other administrative tasks.

Definition of a Campaign

In the most basic manifestation, the advertiser passes to the Present system (either by a Web interface, via an electronic channel using an XML formatting, or by other means), the definition of the campaign it wishes to launch. The definition of the campaign includes multiple instances of:

The promotional message.

Typically the promotional message would be "rich"—not only text but also graphics, animation, etc (possible format: Web content).

Definition of the target audience:

Users' Demographic context (filters on common fields such as age, sex, education, address, etc)

Target users' contexts of interest—a set of keywords the campaign is associated with. These keywords are to be matched with the targeted users' contexts of interest.

Information entered by the users into the social network.

Behavioral information of the users within the system, including but not limited to their track-record in responding to advertisements and incentives.

Behavioral information of the users within the social network, including but not limited to their ranking within a specified context.

Information obtained from $3^{rd}$ party resources, such as data-mining of information available on the net for each user.

Minimal requirements—for example minimal size of target user social network

Cross-checking of information between the various sources

Incentive(s):
  Target audience per incentive, as defined above.
  The visual elements (text, graphics, etc) associated with the incentive
  Time limits
  Type (see below section)
  Value (dependent on the type, e.g. dollars, percentage of the marketed product or service)
  Contract details (will be specified below, alongside the handling of said contracts).

Beyond abstract messages, the advertised service or product may specifically be linked to a listed item/s and/or item categories representing for example:
  Physical service—offering discount as incentive
  Physical product manufacturer—offering a giveaway shipment on request as incentive
  Digital item such as MP3 music—offering free download as incentive
  Website domain—offering temporary subscription as incentive
  Book category under Amazon—offering discount as incentive From a perspective of the system, the advertisers defined a set of incentives to be distributed to some or all of the users to whom the campaign is delivered. The incentives need not be homogenous, but instead may be of disparate types and values. For example the incentive may be giveaways, early or privileged (VIP) access, discounts, "limited time offers", etc.

Note that there is no restriction for a user to be eligible to multiple incentive types in the same campaign.

Campaign Database

Figure 9:
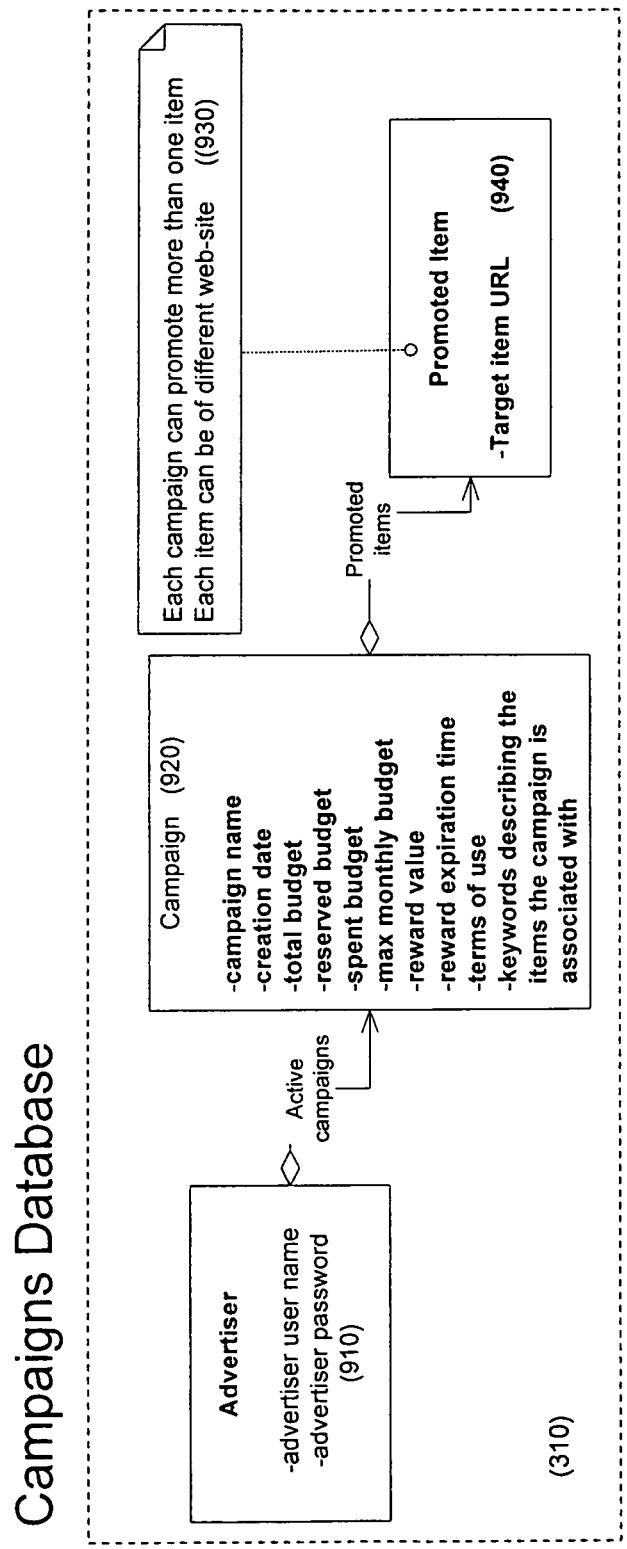
FIG. 9 is a schematic block diagram of an exemplary embodiment of a campaign database, constructed in accordance with the principles of the present invention.

FIG. 9 is a schematic block diagram of an exemplary embodiment of a campaign database 310, constructed in accordance with the principles of the present invention. FIG. 9 depicts an exemplary embodiment of the campaigns database, which allows the advertiser to login 910. The advertiser can initiate multiple campaigns. Each campaign addresses one or more items presented in one or more Websites 930, associated with one or more contexts, and the campaign data includes budget management related information 920. In a preferred embodiment the campaign database also includes target audience specifications. The campaigns promote a URL, which can represent a specific item or a wide selection of products and services 940. In an alternative, the URL may present a database record associated with a product/service, not essentially published on the Web.

The Cost of a Campaign—Pricing by the System

In certain embodiments of the invention, the advertiser may be charged for the campaign.

The pricing of services to advertisers may be as simple as a flat fee, or as complicated as to take into account the predicted impact of the campaign, which depends on the whole social network structure and it's history. Pricing may be such that it can be determined before the campaign is launched, or after the incentives have been used, or both. It may depend on incentives actually used, actual spread of word-of-mouth, etc.

Pricing may further depend on the parameters of the users which have been offered the incentive and/or users which have reserved the incentive and/or that successfully completed the task and received the incentive. Said parameters may include all those used to specify the target audience of the campaign.

For the both cases, the definition of the campaign may include budgetary considerations. The advertiser may Manual budgeting: Send a proposed campaign definition to the system to be priced and to calculate projected market impact, adjust the campaign accordingly, re-price, etc until the goal target is met.

Automatic budgeting: Specify a specific budget available and indicate which of the target audience definitions should be adjusted to fit the budget.

Of course, as said charge may depend on, among other considerations, the size of the target audience and the ranking of members within the social network, advertisers would have to consider how much to invest in the campaign, with more money giving both higher quality and a higher number of users to whom the message is communicated.

A good example of this is the prime opinion leaders. The system of the present invention is aware of how many messages overall opinion leaders are sent, and realizes that over a certain number the impact of every specific message decreases.

This allows for an embodiment of the invention whereby advertisers bid on pricing of services so as to have their message delivered and/or incentive offered to users of higher rank in the social network and/or have better match to target audience and/or are more likely to make use of the incentive.

It is clear that planning an advertising campaign is a complicated matter—both as related to cost and as related to projected impact. In certain embodiments, the system may therefore provide assistance to advertisers in the planning stages:

Providing results of previous campaigns, simulating impact of new campaigns, etc, taking into account an advertiser's budgetary and other limitations.

The process of defining a target audience may be "interactive" the advertiser sends a proposed "audience filter" to the system (by demographics, ranking as opinion-maker, context, etc) and the system returns the number of users who fit the match and statistical information regarding said group. Details of individual users will typically not be returned, both for reasons of privacy and to maintain control of the advertising channel within the system.

User Information

The system composes a comprehensive user view from the available resources (e.g. user registration profile, social network sites, data mining results, etc). A typical view may comprise of:
  Unique user identifier (e.g. username)
  User profile—personal details (e.g. name, address, sex, age)
  User social network—contacts the user is connected with in his social network scope (up to a certain degree).
  User contexts of interest—a set of contexts the user is interested and/or active in. In this regard the system maintains a record regarding the activity level in each context.

Figure 10:
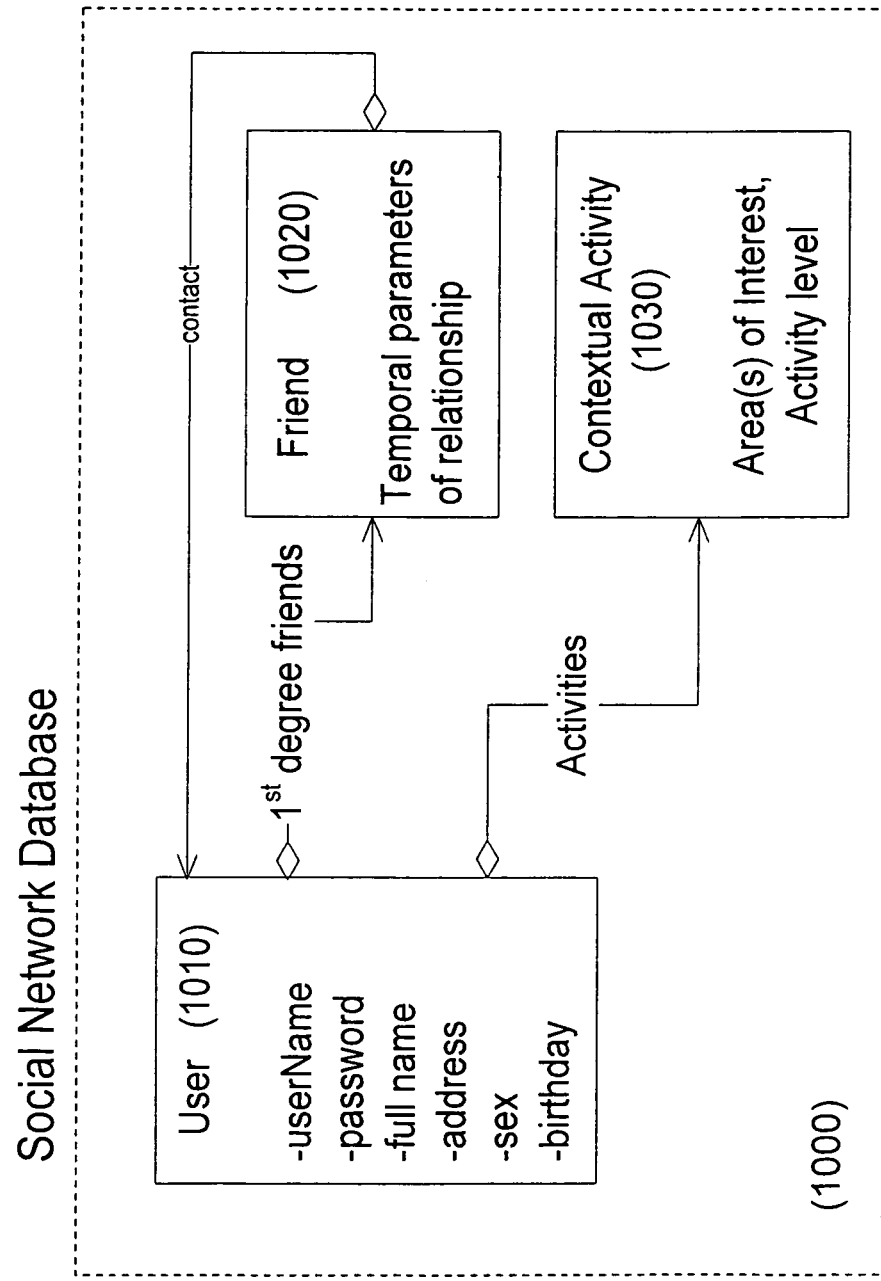
FIG. 10 is a schematic block diagram of a simplified database scheme containing useful data, constructed in accordance with the principles of the present invention.

FIG. 10 is a schematic block diagram of a simplified database scheme containing useful data for a social network database 1000, constructed in accordance with the principles of the present invention. The data includes $1^{st}$ degree friends 1020 of a user 1010 and a user's activity 1030 within his contexts of interest. Contexts can represent a set of keywords, line of interest or other kind of classification scope.

As described above, the exact implementation of the social network is outside the scope of this patent (and in certain embodiments may be outside the scope of the Present system). To make things clear, however, listed below are several ways in which the user's context could potentially be derived within the social network:

Areas of interest stated explicitly by the user. These may be in a professional, recreational or advertisement-specific context.

If the social system contains a home page, blog or other ways of personal expression, the text itself may be analyzed, as is done by search engines.

Bookmarks and external links maintained by the user within the social network.

A context may be enforced by close ties to people belonging to the same context, forming a context-centric community.

User Rating—A Measure of Influence

As in the real world, the conjuncture of a social network structure and contexts allow people to be opinion leaders in one field, but not in another.

An example of such context dependence may be as follows: Linus Torvald may be generally considered an opinion-maker in the Linux context, but his opinions regarding good plumbers in Bangalore are held in significantly lower regard.

The system models these relations using users rating database. It is generated from one or a plurality of social network databases. In addition to the context activity of the user, it rates all the user's social network members (limited by max degree) connected to this user in parameters implying on the inter-trust between the user and the contact at each context of mutual interest. These parameters can include: total reviews authored by contact and responded by user, total questions initiated by the user to the contact and the total reviews authored by the contact, but which may have been contradicted by the user's reviews or voting.

More implicit rating related indicators may also be used in form of user-to-user interactions (e.g. messages, impressions, etc) and other activities performed in the scope of a group/affiliate.

It should be noted that it's the system responsibility to maintain and update this database in order to project current inter-trust state.

Figure 11:
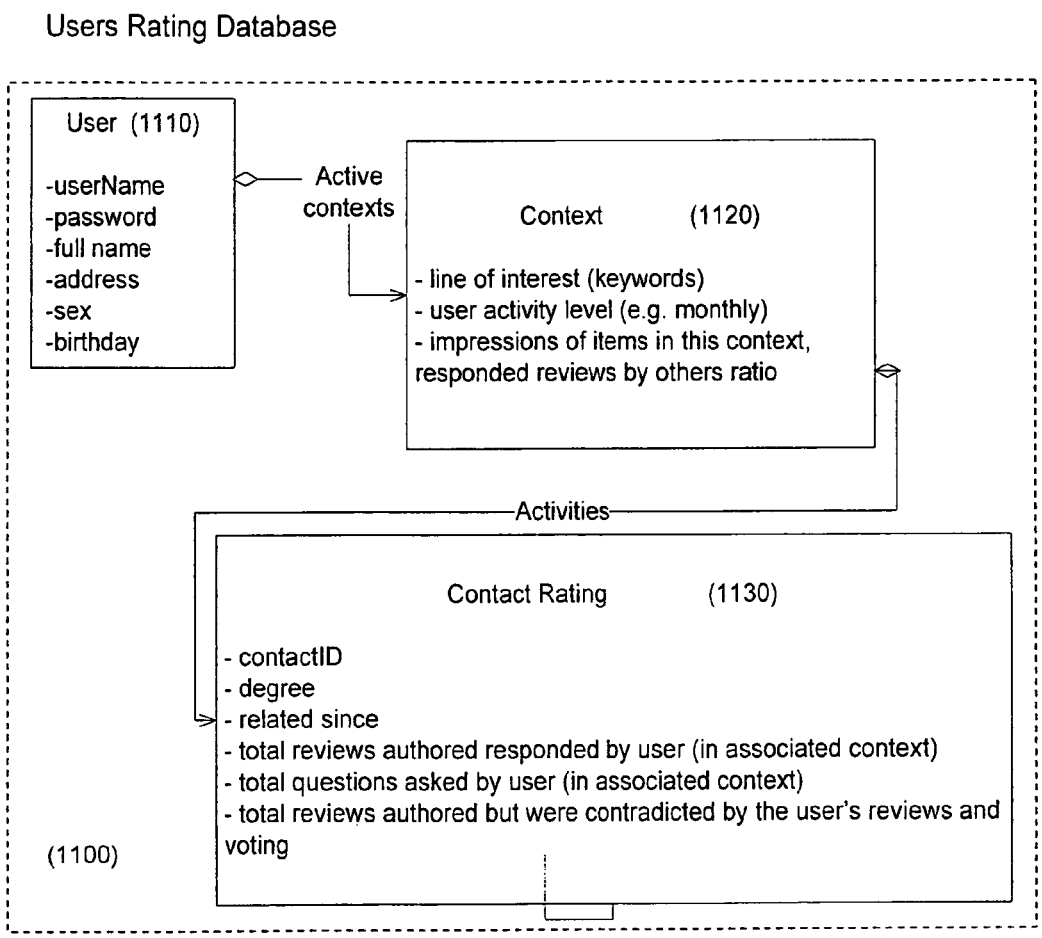
FIG. 11 is a schematic block diagram of the user's rating database, constructed in accordance with the principles of the present invention.

FIG. 11 is a schematic block diagram of the user's rating database 1100, constructed in accordance with the principles of the present invention. User's rating database 1100 provides information about the user 1110, the context 1120 and the content rating 1130.

In another embodiment of the invention, other information sources for a user's contexts of interest may be deduced from:

The marketed items Web-server/s in which the user search and browse

The campaign management server in which the user expresses and exercises incentives.

Targeting Users Participating in the Campaign

The parameters of context and social connection between the various people are merged into a unified ranking of users as related to a specific advertising campaign.

As specified above, multiple concurrent parameters exist for the selection of the target audience. Some are easily implemented (such as age or sex), while some are not. Below, is a discussion of the more subtle criteria.

One of the primary ways of selecting a target audience is by contexts with which both the users and the advertisement are associated. The advertisement context is stated explicitly by the advertiser, whereas the user's keywords are extracted from the social network and other available user information, such as demographic details.

The present invention may also take into account overlap between contexts and the context's relative scope. For example, "iMac" is a context which is part of the more generalized "computer" context. The "iPod" and "mp3" contexts are strongly related, while "iPod" and "radishes" are not. The creation/derivation of the context map is outside the scope of this patent. The use of this map for advertising over a social network is not.

Targeting Incentives to Participant Users

It is clear, however, that simply targeting specific influential users with messages may be insufficient, as the users have little motivation to echo the message. To this end, an advertiser may elect to couple the message with an incentive. The range of possible incentives is vast, and generally well known.

The system than elects the optimal distribution of incentives to higher and lower ranked opinion leaders as to achieve maximum impact. As part of this process, the conjunction of user contexts and user ranking within said context can be combined in a multitude of ways. For example, the system may first find the strongest opinion leaders, and then filter out those unrelated to desired contexts, or the system may first filter the users to those of the desired context and then rank them by influence. A typical manifestation of the system, however, will do neither of these extremes, but instead assign a (non-linear) weight function to match of user to context and (non-linear) weight function of user influence and combine the two.

Figure 12:
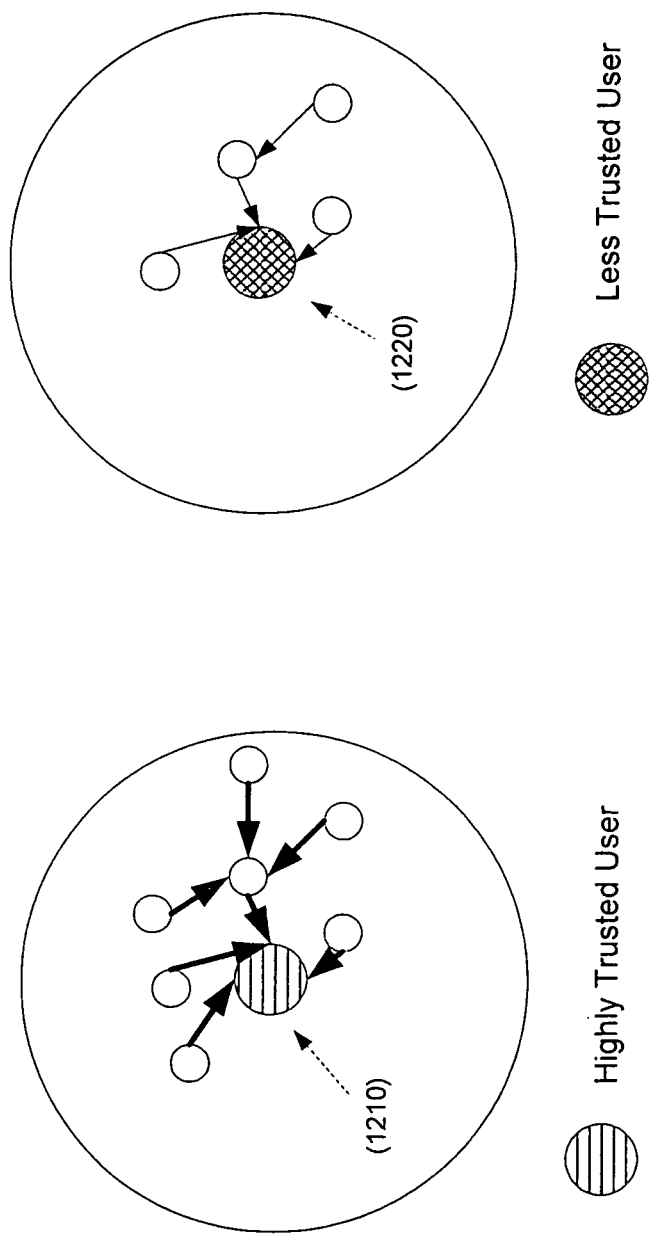
FIG. 12 is a schematic block diagram comparing two users who were qualified for a campaign in terms of contexts matching, constructed in accordance with the principles of the present invention.

FIG. 12 is a schematic block diagram comparing two users who were qualified for a campaign in terms of context matching, constructed in accordance with the principles of the present invention. On the left side a user ranked as highly trusted 1210 thanks to strong inter-trust streaming in from his social network members. Thick arrows denote a high inter-trust level flowing in. Conversely, on the right-side is shown a lowly trusted user 1220, who wins less trust from fewer of his network members. In this specific scenario, highly trusted user 1210 may be privileged to get a higher reward or other preference over less trusted user 1220. Note, that both users may belong to the same social network, but still may be reward discriminated due to inter-trust differentiation.

When the system operates over several social networks, the optimization may span the networks.

As the question of user influence ranking is of high importance, the system may seek to periodically validate a users ranking by targeting said user an incentive above the level he is usually presented with, thus increasing the chance the user will take part in the campaign, and subsequently follow the impact that user's opinion had on other users.

Figure 13:
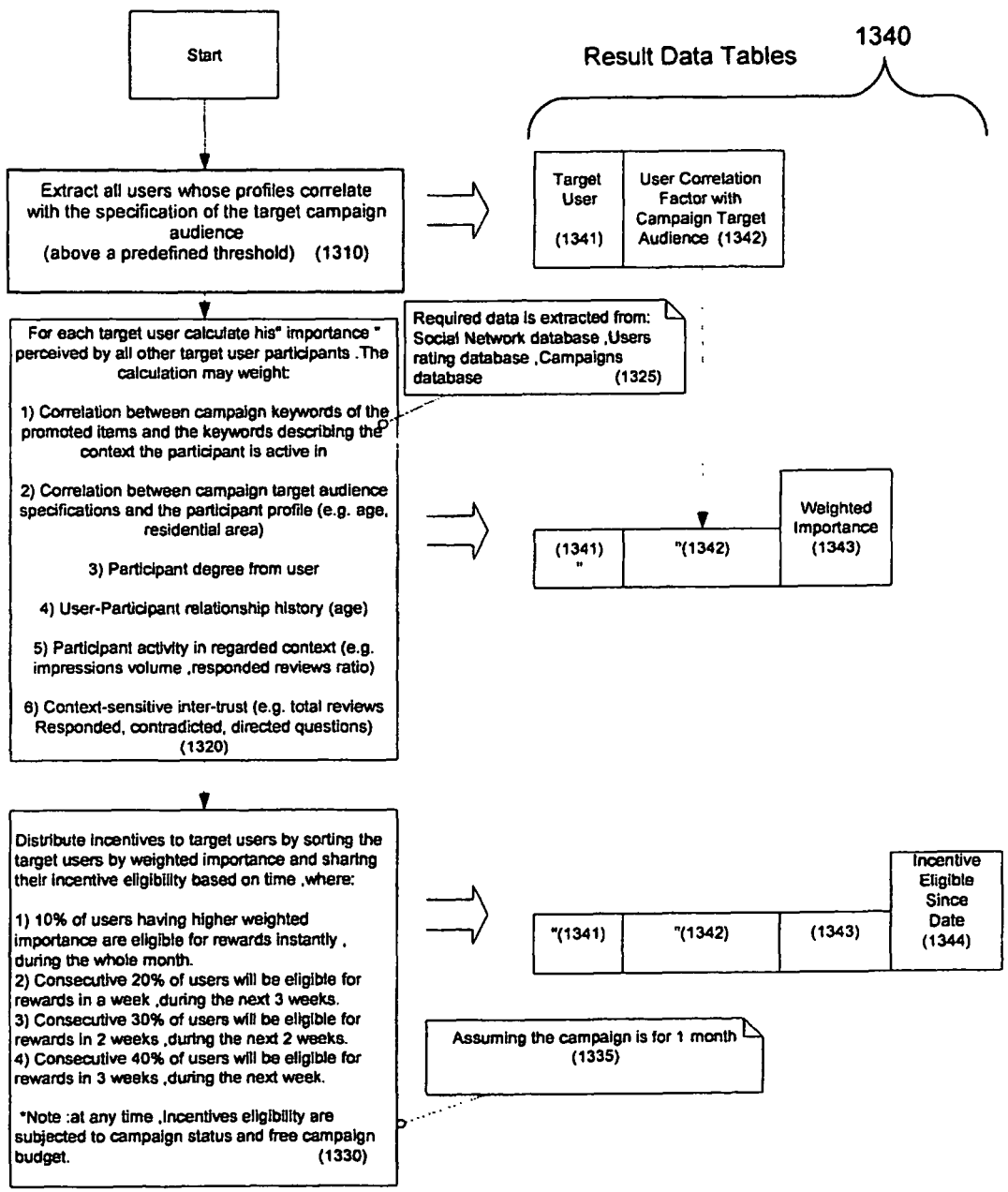
FIG. 13 is a schematic flow diagram of an exemplary embodiment of incentive budgeting for allocations to eligible users, constructed according the principles of the present invention.

FIG. 13 is a schematic flow diagram of an exemplary embodiment of incentive budgeting for allocations to eligible users, constructed according the principles of the present invention. Incentive budgeting begins with the extraction of all users whose profiles correlate with the specification of the target campaign audience, i.e., above a predefined threshold 1310. Next, calculate each target user's "importance" perceived by all other target user participants 1320 and distribute incentives to target users by sorting the target users by weighted importance and sharing their incentive eligibility based on time 1330. Required data is extracted from the Social Network database (may also be data mined), Users rating database and the Campaigns database 1325. An exemplary campaign of one month is depicted 1335. The resulting data tables show the Target User 1341, the User Correlation Factor with the Campaign Target Audience 1342, the Weighted Importance 1343 and the Incentive Eligible Since Date 1344.

When the system of the present invention spans multiple social networks and/or sites, the system may distribute the incentive to several networks/sites, optimizing distributions for best predicated impact.

Figure 14:
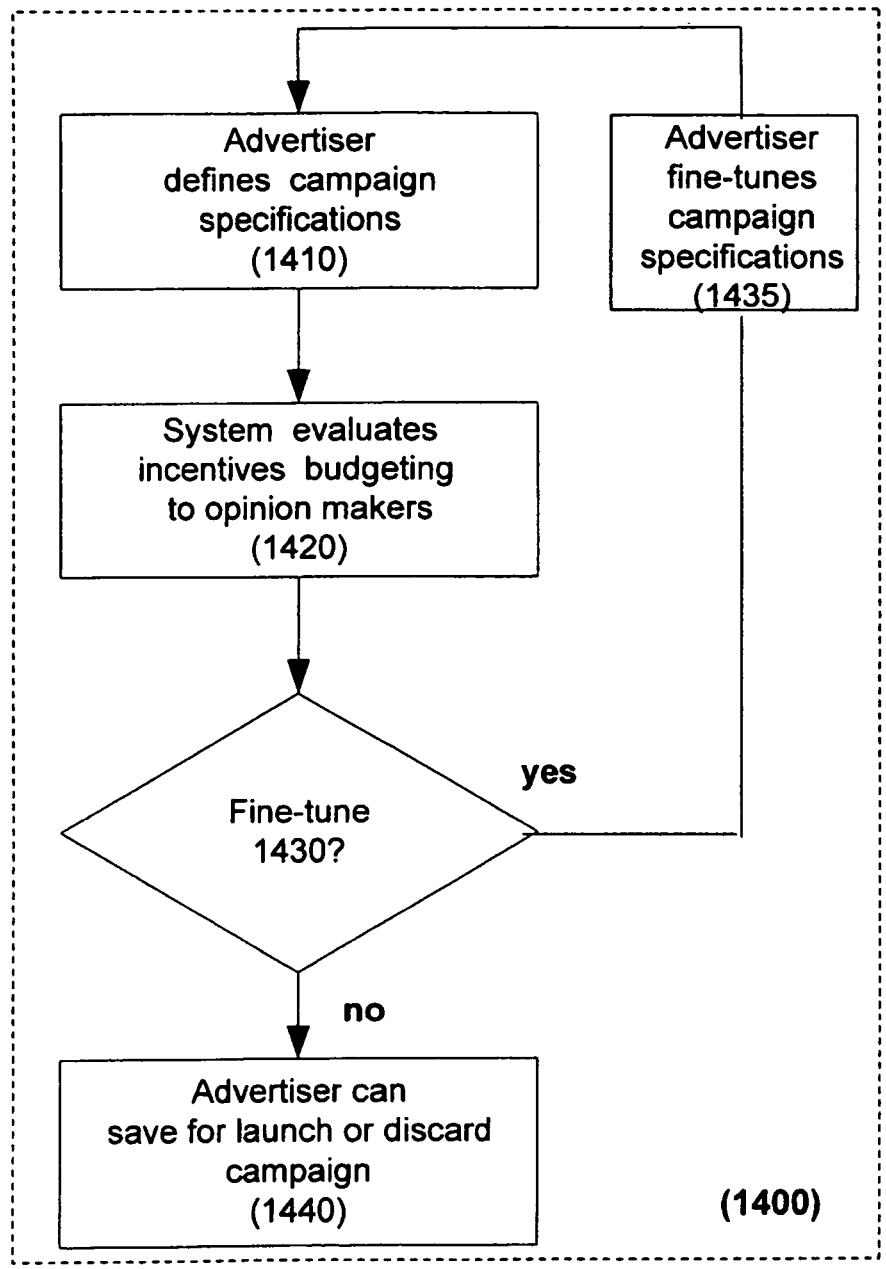
FIG. 14 is a flow chart illustrating how the incentive budgeting process iteratively integrates within the campaign pricing procedure, performed according the principles of the present invention.

FIG. 14 is a flow chart illustrating how the incentive budgeting process iteratively integrates within the campaign pricing procedure 1400, performed according the principles of the present invention. Once the advertiser specifies the campaign 1410, the incentive budgeting is executed to generate results used to evaluate campaign costs 1420, as detailed in Table I below. If the campaign is out of budget and there is a need to fine-tune 1430, the advertiser can fine-tune the campaign specifications 1435, e.g., by increasing the budget, playing with other campaign settings such as the threshold of target users correlation factor with the campaign target audience and/or, targeting smaller users group by selecting a more focused geographical region, etc. Once fine-tuning is complete, the advertiser can save the campaign for launch or discard the campaign 1440.

Figure 15:
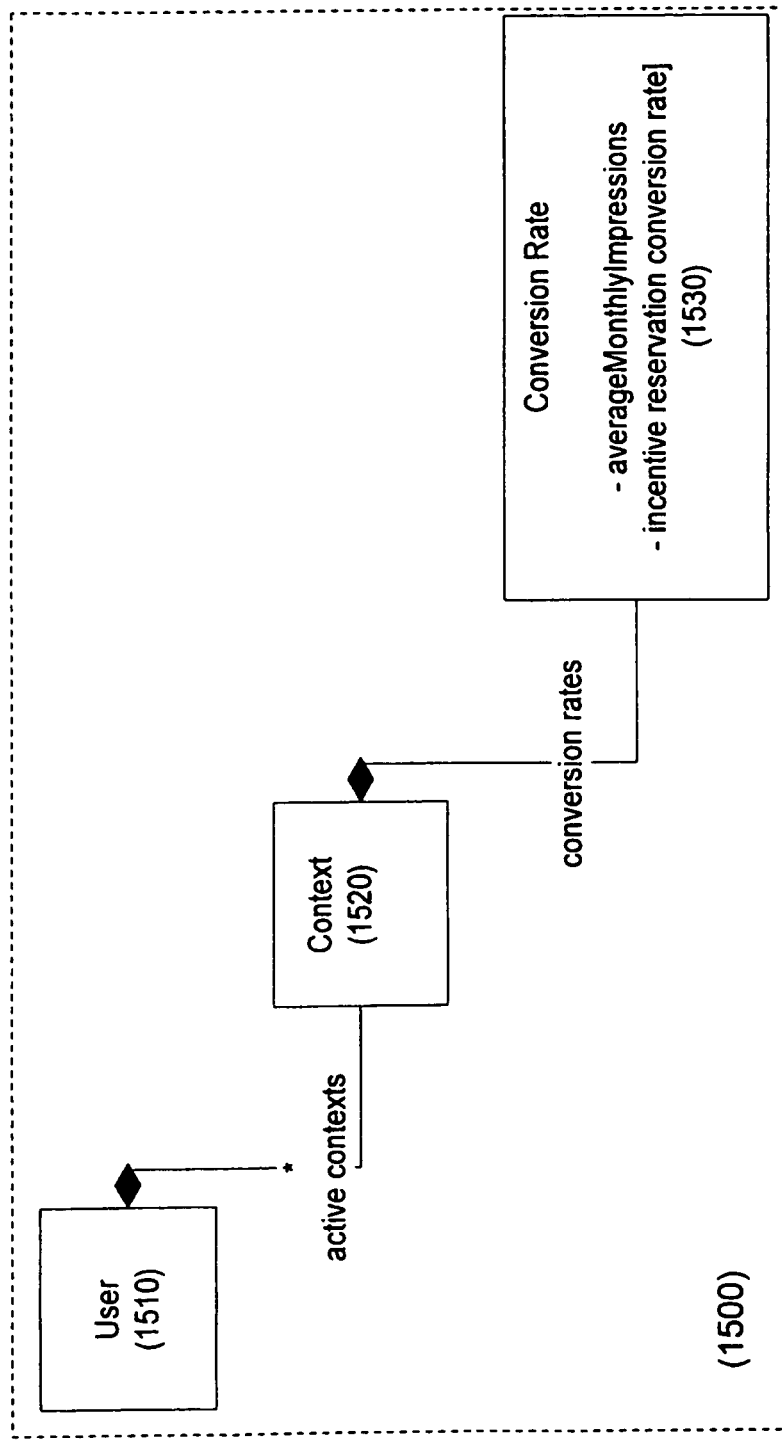
FIG. 15 is an exemplary database schematic diagram of a data structure for tracking users' behavior in order to evaluate campaign costs, constructed according the principles of the present invention.

FIG. 15 is an exemplary database schematic diagram of a data structure for tracking users' behavior in order to evaluate campaign costs 1500, constructed according the principles of the present invention. The monitored behaviors of a user 1510 are context-sensitive 1520 and can be managed as an extension of the users' ratings database, with reference to FIG. 11 above. FIG. 15 shows tracking of the user's average number of times within a month he gets impressions of incentives, within a specific context 1520, and his tendency to act upon them by reserving incentives. This is referred to as "the incentive reservation conversion rate" 1530.

Table I, below, is an exemplary formulation of an equation to evaluate total campaign cost where the advertiser is charged for: campaign registration fees, cost-per-incentive-impression and cost-per-incentive-reservation, formulated according the principles of the present invention. Payment for later word-of-mouth dissemination is not included. The pricing also compiles each opinion leaders "weighted importance", with reference to FIG. 11 above, in such a way that when more influential opinion leaders reserve an incentive the charge is higher than less influential ones.

This is all in the context of the campaigns' target audience specifications. Note that while this is a comparatively simple embodiment, it can easily be expanded to compile more intricate behavioral hints, in conjunction with additional database acquisition of statistics related to users' conversion rates and other actions. For example, the conversion rates can also account for a broader scope of the conversion rates beyond the scope of the user. Another option is to weight the advertiser incentive value compared to others offered to a specific user. After all there is a higher probability that the opinion leader will choose the more valuable incentive.

TABLE I

| | |
|---|---|
| $C_{total}$ | Forecast monthly campaign cost |
| $R_{eg}$ | Campaign registration fees |
| U | Collection of target users |
| u | A single target user |
| $F_{ins}(u)$ | Forecast of total incentives impressions |
| $C_{reserve}(u)$ | Cost per incentive reservation |
| $C_{convert}(u)$ | Costs of converted incentives reservations |
| I(u) | User's weighted importance |
| $I_{monthly}(u)$ | User's average monthly impressions |
| $E_{monthly}(u)$ | Incentive eligibility over month (see FIG. 13 "incentive eligible since date") |
| R(u) | User's incentive reservation conversion rate |

$$C_{total} = R_{eg} + \sum_{u \in U} (F_{ins}(u) \times C_{reserve}(u) + C_{convert}(u) \times I(u))$$

$$F_{ins}(u) = I_{monthly}(u) \times E_{monthly}(u)$$
$$C_{convert}(u) = C_{reserve}(u) \times R(u)$$

Incentives Lifecycle

From the perspective of the user, the system presents him with a list of messages with associated incentives. The user may elect to make use of them or not.

Some incentives will have time limits (which may, of course, be different to different user ranks). Some incentives may be mutually exclusive with others (a user may elect to take incentive A or incentive B, but not both).

Some incentives will have conditions attached. For example:

An opinion leader will get his money back for purchase of product X provided she writes a review of said product/service.

An incentive is given only if user elects to purchase a minimum amount of goods or services from advertiser.

More than one condition may also apply (for example, write a review and send messages to 5 other users notifying them of the new review).

A free giveaway is given only if the user commits to promote/advertise the product service.

In cases conditions apply, users must consent to the terms prior to reserving and subsequently receiving the incentive.

In some cases, however, a condition need not apply. For example: night clubs may provide free VIP tickets to movie starts and fashion models, content with having them be seen in their establishment.

When incentives are dependent on some action by the user, said action may have a time limit. In some cases, a user will be required to indicate he intends to take advantage of an incentive (such as a theater ticket, for example) and that incentive will be reserved (allocated to it). In some embodiments the choice to make use of an incentive may incur a price on the user.

Alternatively, in some embodiments, failure to act on an incentive once "reserved" may result in a penalty, whether monetary or otherwise (such as lowering his scope as an opinion leader, and hence leading to lesser incentives be offered to him in the future).

Conversely, a user may announce he declines the incentive, in which case the incentive may be re-offered to another user. This may also occur automatically after the period for which the incentive is offered has lapsed.

Figure 16:
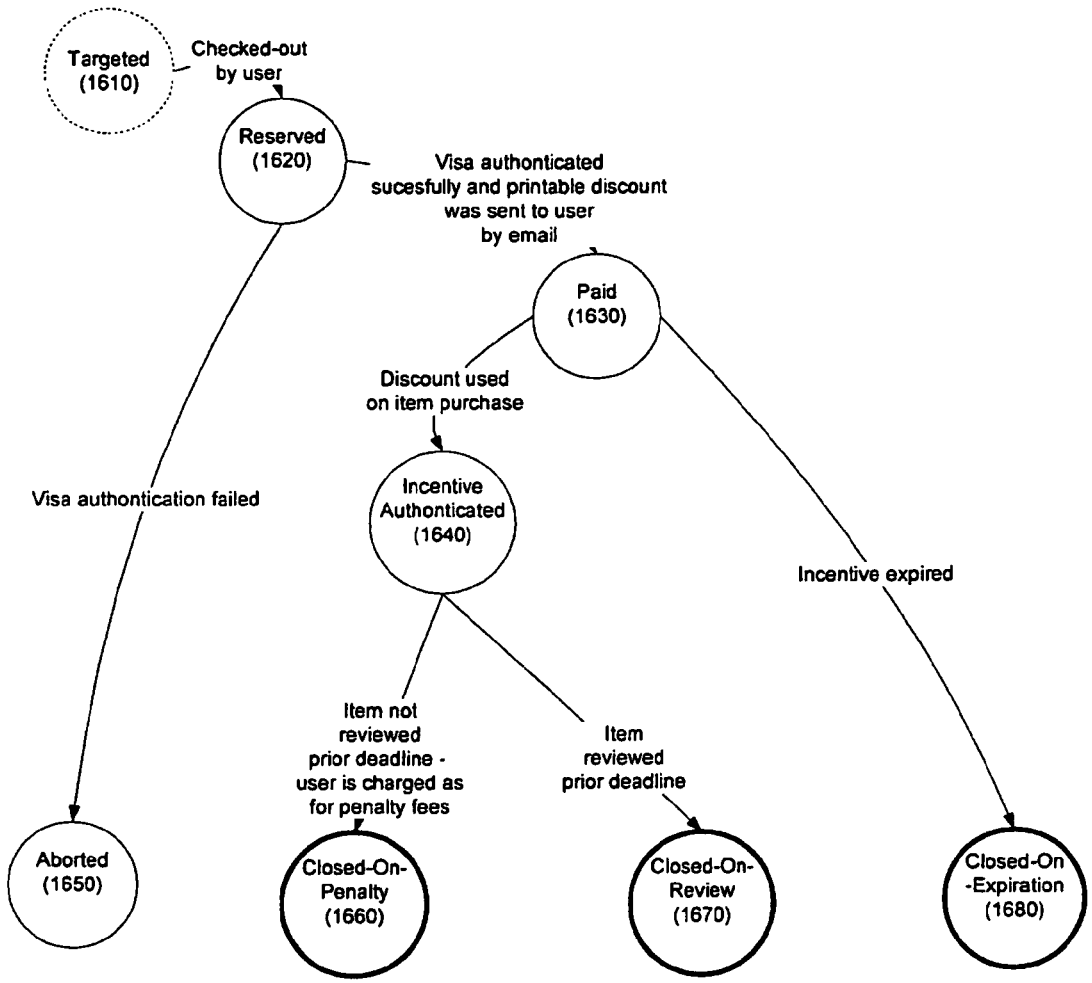
FIG. 16 is a schematic diagram of the rewards state for an exemplary embodiment of the present invention.

FIG. 16 is a schematic diagram of the rewards state for an exemplary embodiment of the present invention.

On reservation 1620—the campaign budget is updated, making the incentive value on reserve.

On abort 1650—reverse the checkout operation in sense of campaign budget

Incentive authenticated 1640—the campaign budget is updated, the formerly reserved incentive is now spent after having been paid 1630.

Closed-on-penalty 1660—user is charged by penalty fees for reserving an incentive but not using it.

Closed-on-review 1670—review is disseminated among target user's 1610 social members.

Closed-on-expiration 1680—as in "on abort", the campaign budget is rolled back

Figure 17:
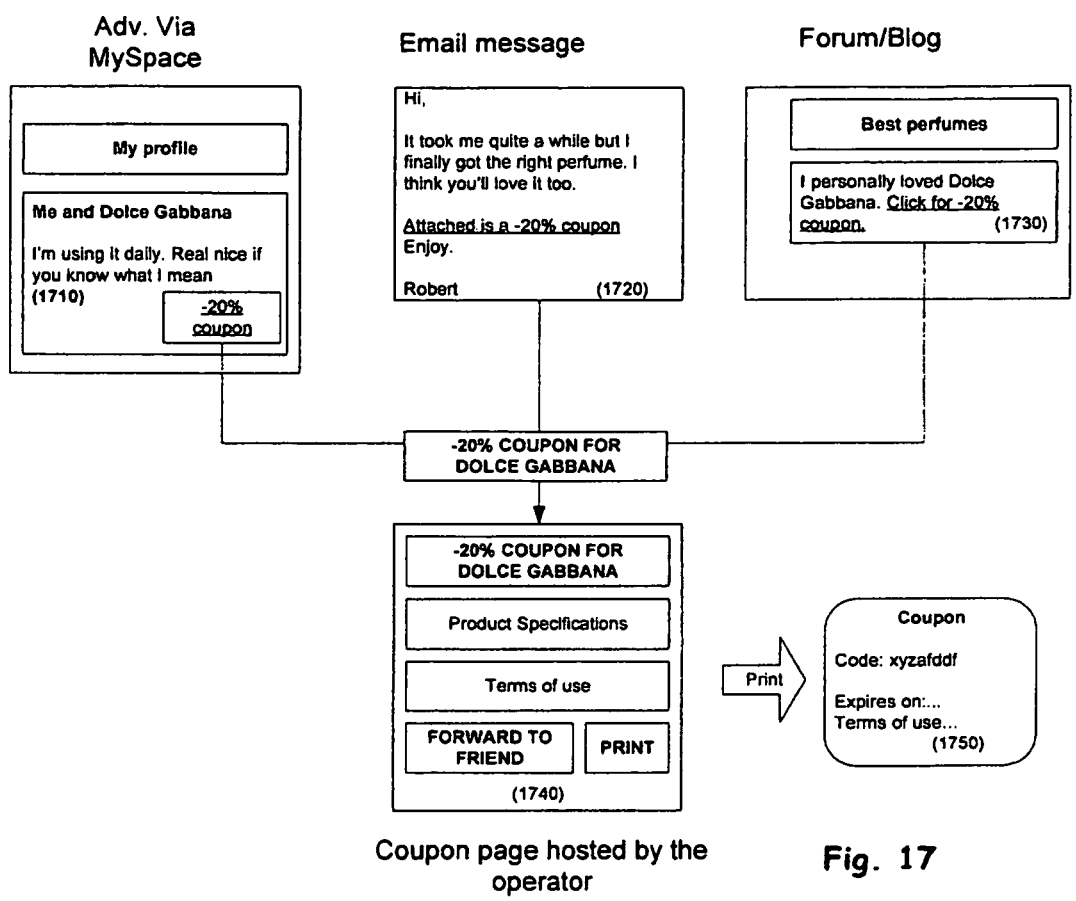
FIG. 17 is a schematic block diagram illustrating two potential dissemination methods for coupons 1750 published by opinion leaders, performed according to the principles of the present invention.

FIG. 17 is a schematic block diagram illustrating two potential dissemination methods for coupons 1750 published by opinion leaders, performed according to the principles of the present invention. The opinion leader is free to advertise his opinion wherever he likes. That includes emails 1720, forums and personal blogs 1730, social network user pages 1730, groups, etc. Anyone interested can click the attached coupon hyperlink and print a coupon 1740 of the promoted item (product/service).

The coupons, for example, provide simple links directing to promotional online resources (e.g. video clips, articles). What's important to note is that these links, just like the coupons, can be monitored to allow measurement of opinion leaders influence.

In this embodiment the opinion leaders can help advertise/market an item (e.g. a product or service) by distributing coupons, which are delivered in the context of a personal recommendation written by them.

This approach has several benefits:
  I. Vast exposure in any online medium—there is no need for integration with any $3^{rd}$ party. It only involves the operator and the public online resources available to all (e.g. forums, blogs, social networks, etc).
  II. Advanced compensation schemes—exact measurement of the actual sales and exposure originated by each opinion leader. This measurement enables new compensation schemes, such as revenue sharing, performance based contracts, etc.

One of the principal objects of the present invention is to keep track of the opinion leaders' viral influence. For this aim Table IIa illustrates a simple database capable of tracking the disseminated coupons described above. This data is eventually utilized to check the opinion leader's performance, thus promoting/demoting his status.

TABLE IIa

| Campaign Coupons Database |
| --- |
| campaignId |
| promotedItemId |
| discount percentage |
| terms of use |
| total coupons |
| total printed coupons |
| total exercised coupons |

Table IIa provides an addition to the campaigns database. The table comprises general coupon information and statistics about its current usage.

Table IIb tracks the converted coupons. The conversion may be of several kinds:
  Coupon print
  Coupon exercising
  Call for more info Beyond historical records, this conversion data serves the operator in updating the opinion leaders' status. Opinion leaders that did well are promoted and others may even be demoted when not meeting minimal benchmarks.

TABLE IIb

| Coupon Usage |
| --- |
| couponId |
| camapignId |
| opinionLeaderId |
| printedOn: date |
| calledUpon: boolean |
| expirationDate: date |
| exercisedOn: date |

Opinion Leaders' Inter-Trust Maintenance

Once the user has been presented with the message (regardless of incentives, but especially when a user comments/reviews an offering), the system will monitor the spread of his comment to other users within his social network. This will then feed back into the social network and strengthen or weaken the opinion leader's ranking.

Another factor of importance is this regard is whether, in instances where the review is quantitative, whether the opinion of the opinion leader is echoed by others, or contradicted by them. One possible implementation of this can be a voting mechanism in which a user can vote for or against a review.

Campaign Benefits Reputation

In many cases, the benefit of the advertiser is in the dissemination of the opinion leader's response to their social network members. This dissemination can take form in multiple ways, for example:
  Next to the advertised item, display a list of opinion leaders, which have responded to it. The list may include the respondents' personal details, day of response and other response information such as their authored reviews, purchase dates, etc.
  Calculate an overall, reputation score to the advertised item—weight the opinion leaders' response (e.g. positive vote, negative vote, assigned customer satisfaction grade) with their personal inter-trust by the user (viewer)
  Next to the advertised item, display statistics about the actions performed by the opinion leaders, such as total views, amount of coupons printed, etc.

Contexts

The system maintains information regarding the coupling and overlap between the various contexts. For example: the "flowers" and "muscle car" contexts are unrelated, "flowers" and "anniversary" are related, whereas "lilies" is a sub-context of "flowers".

The definition of contexts and their interrelations is not unique to the system of the present invention. It is present in many search engines (Google, Yahoo, MSN, etc) as in their attached advertising systems. This is a tool which may be used by the present invention and is not part of the claimed invention.

The present invention aims to capture and model trust relationships in the real world. This implies:
  It is intended to trust those with wide-spread reputation in the field
  It is intended to trust those close to us in their field of expertise (if my brother is a medical doctor, I would tend to trust his recommendations beyond those of a doctor unknown to me of equal qualifications and reputation).
  Trust is transitive. Meaning if I trust X and X trusts Y, then one may assume that I trust Y (at least to some degree).

Figure 18:
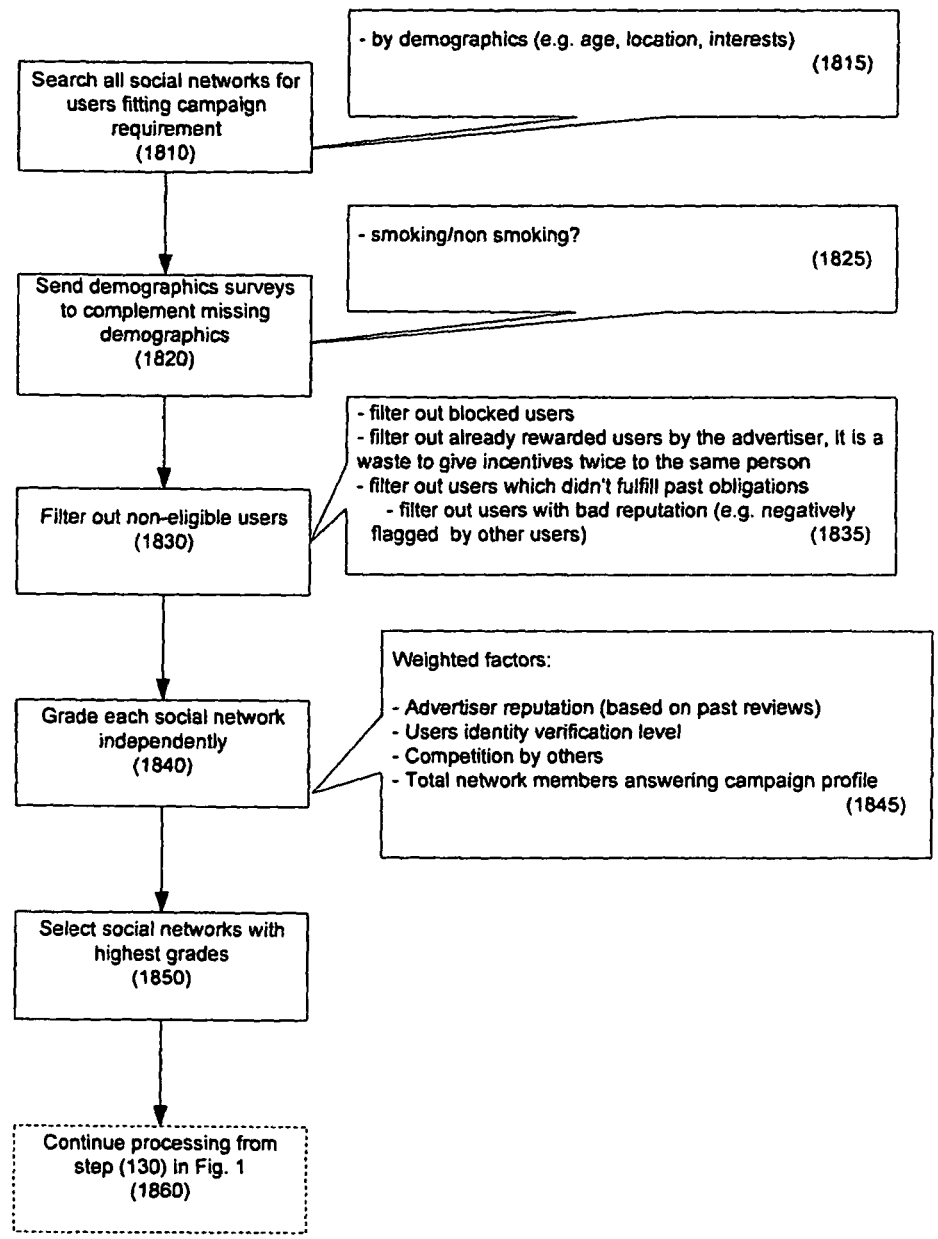
FIG. 18 is a schematic block diagram of an overview of the advertising campaign process concerning more than one social network, constructed in accordance with the principles of the present invention.

Ranking of trust within the context of a social network is outside the scope of this patent. It may be performed in a myriad of ways, and extensive work has been done on the subject. In particular, reference is made to a provisional patent application by the applicant of the present invention. A few references discuss social network trust algorithms:
  "Bandwidth and Echo: Trust, Information, and Gossip in Social Networks", December 2000, Ronald S. Burt, University of Chicago and INSEAD, http://www.google.com/url?sa=U&start=1&q=http://gsbwww.uchicago.edu/fac/ronald .burt/research/B%26E.pdf&e=747
  "Extracting reputation in Multi Agent Systems by Means of Social Network Topology", Josep M. Pujol, Ramon Sanguesa, Jordi Delgado, University of Catalonia http://ccs.mit.edu/dell/reputation/p467-pujol.pdf
  "Supporting trust in Virtual Communities", Alfarez Abdul-Rahman, Stephen Hailes, University College London http://www.cs.ucl.ac.uk/staff/F.AbdulRahman/docs/hicss33.pdf
  "Trust Network-based Filtering to Retrieve Trustworthy Word-Of-Mouth Information", Hironmitsu Kato, Yoshinori Sato, Takashi Fukumoto, Koichi Homma, Toshiro Sasaki, and Motohisa Funabashi, Systems Development Laboratory, Hitachi Ltd. http://www.vs.inf.ethz.ch/events/ubicomp2003sec/papers/secubi03_p05.pdf FIG. 18 is a schematic block diagram of an overview of the advertising campaign process concerning more than one social network, constructed in accordance with the principles of the present invention. Multiple social networks are searched for users meeting the campaign requirements 1810, for example by demographics 1815. Users that are missing any valuable demographic necessary for the campaign are sent surveys to complement this information and achieve better targeting 1820, e.g., for seating arrangements, "smoking or non-smoking?" 1825.

The next step is to filter out from the selected users group, users that are not eligible to get incentives 1830, e.g., blocked users, etc. 1835. Once the final list of participant users is obtained, independently grades each social network to which they belong 1840, by weighting factors that concern the whole network scope, rather than an individual scope (e.g. advertisers current reputation, overall competition, total users answering campaign profile, etc.) 1845. The graded networks are sorted according to the users with the most potential 1850, and those, accordingly, are passed for further sorting into opinion-making order 1860 (with reference to step 130, FIG. 1 described above).

Having described the present invention with regard to certain specific embodiments thereof, it is to be understood that the description is not meant as a limitation, since further modifications will now suggest themselves to those skilled in the art, and it is intended to cover such modifications as fall within the scope of the appended claims.

We claim:

1. A method of delivering messages to users of at least one computerized social network, said method comprising:
   determining a specification of a target campaign audience for said messages, said specification defining determining said target campaign audience among said users of said at least one computerized social network in accordance with said specification,
   ranking, using a computer processor, said target campaign audience according to reputation by which said users deem some of said users in said target campaign audience to be of higher influence in said campaign context than others of said users in said target campaign audience, by calculating the importance of each of a plurality of users in said target campaign audience by weighting:
   extent of activity in said campaign context, indicated in said at least one social network between pairs of said users, of said one of a pair of said users, who is deemed to be an opinion leader by the other of said pair; and
   degrees of trust in said campaign context, indicated in said at least one social network, of said one of said pair of said users who is deemed to be an opinion leader by the other of said pair;
   selecting said opinion leaders based on said ranking by:
   assigning a first non-linear weight function to matching of a user to said campaign context;
   assigning a second non-linear weight function to a user influence; and
   combining said first and second non-linear weight functions as given by the following expression:

$$I(u)=F(c)(FM(uc),FU(i))$$

where I(u)=User influence in campaign context,
   F(c)=Combining function,
   FM(uc)=Non-linear function of match of user to context; and
   FU(i)=Non-linear function of user influence; and
   delivering said messages to said opinion leaders.

2. The method of claim 1 and wherein said extent of activity in said campaign context is a function of at least one of:
   an activity level of said users within contexts related to said campaign context; a conversion rate at which said users to act upon messages in said campaign context; and
   a ratio of a number of reviews, written by said users in said campaign context, to a number of said reviews that others respond to.

3. The method of claim 1 and wherein said messages comprise messages relating to at least one of a product and a service.

4. The method of claim 1 and wherein said degrees of trust in said campaign context are a function of at least one of:
   a volume of communication in said campaign context between said pair;
   reviews in said campaign context authored by said one of said pair responded to by said other of said pair;
   reviews in said campaign context authored by said one of said pair contradicted by reviews of said other of said pair;
   reviews in said campaign context authored by said one of said pair contradicted by actions of said other of said pair;
   questions in said campaign context initiated by said other of said pair to said one of said pair; and
   rating in said campaign context of said one of said pair by said other of said pair.

5. The method of claim 4 and wherein said degrees of trust in said campaign context is also a function of at least one of:
   a time duration of a relationship between said pair;
   a degree of separation between said pair;
   a volume of communication between said pair; and
   a volume of interactions between said pair.

6. The method of claim 4 and wherein said reviews in said campaign context comprise at least one of reviews, endorsements and other feedback.

* * * * *